United States Patent [19]

Baggett

[11] 3,947,383

[45] Mar. 30, 1976

[54] WET STRENGTH RESIN
[75] Inventor: Joseph M. Baggett, Freeport, Tex.
[73] Assignee: The Dow Chemical Company, Midland, Mich.
[22] Filed: Apr. 29, 1974
[21] Appl. No.: 465,041

[52] U.S. Cl. .......................... 260/2 BP; 260/29.2 EP
[51] Int. Cl.$^2$ ......................................... C08G 65/26
[58] Field of Search .................. 260/2 BP, 29.2 EP

[56] References Cited
UNITED STATES PATENTS

| | | | |
|---|---|---|---|
| 2,573,957 | 11/1951 | Daniel et al. ......................... | 117/76 |
| 3,174,928 | 3/1965 | Kekish .................................. | 210/54 |
| 3,441,609 | 4/1969 | McKelvey et al. .................... | 260/583 |
| 3,655,506 | 4/1972 | Baggett .............................. | 162/164 |

*Primary Examiner*—Donald E. Czaja
*Assistant Examiner*—E. A. Nielsen
*Attorney, Agent, or Firm*—L. Wayne White

[57] ABSTRACT

Water-soluble thermosetting cationic resins having improved properties are prepared by a process wherein a small excess of epichlorohydrin is reacted with an aqueous solution of ammonia to form an intermediate resin solution, this resin solution is reacted with sufficient strong base to neutralize the ionic chloride present, then additional epichlorohydrin is reacted with the neutralized resin solution. The final resin product is useful as an additive to enhance the wet strength of paper.

5 Claims, No Drawings

WET STRENGTH RESIN

BACKGROUND OF THE INVENTION

The present invention relates to a new process for making epichlorohydrin-ammonia resins and to the new resinous compositions thereby obtained. The reaction of ammonia with epichlorohydrin to produce resins has previously been accomplished by a procedure wherein the two reactants have been combined and reacted in a single reaction step. Insoluble, cross-linked resins useful as ion exchange resins have been made by such processes using either an aqueous or an anhydrous organic reaction medium. Similarly, water-soluble resins have been made by reacting epichlorohydrin with aqueous ammonia in various proportions. Improved resins made by carrying out the epichlorohydrin-ammonia reaction in two stages are described in my U.S. Pat. No. 3,655,506. These resins have been used as binders in textile printing pastes, as surfactants, and as agents for treating textile fibers or plastic films to promote adhesion of dyes or plastic topcoats. Such resins also provide additional wet strength to paper when added to the paper pulp at an appropriate stage.

SUMMARY OF THE INVENTION

It has been found that water-soluble resins having even more advantageous properties as wet strength additives for paper are obtained when the two stage process described in U.S. Pat. No. 3,655,506 is varied by inserting between the two stages a step whereby the ionic chloride present in the reaction mixture is neutralized by adding about an equivalent quantity of strong base, preferably an alkali metal hydroxide or equivalent thereof. Essentially, this improved process comprises the steps:

1. forming an intermediate resin or prepolymer solution by reacting about 0.9 to 2.1 moles of epichlorohydrin with one mole of ammonia in aqueous solution and maintaining the reaction mixture thereby obtained at 0°–100°C. until essentially no unreacted epichlorohydrin remains, 2. adding to the reaction mixture a quantity of strong inorganic base about equivalent to the ionic chloride determined to be present in the intermediate resin solution, and 3. reacting the intermediate resin solution thereby formed with about 0.1 –1 part by weight of additional epichlorohydrin per part of resin solids in the prepolymer solution at 40°–100°C. Preferably, the reaction mixture is heated until essentially no unreacted epichlorohydrin remains.

The polyisopropanolamine resin thereby produced differs in some way not fully understood from the product of the prior art one step procedure so that this new resin is substantially superior as a paper additive to increase wet strength.

DETAILED DESCRIPTION

The first step of the new process is preferably carried out by adding the initial 0.9–2.1 moles, preferably about 1–1.5 moles, of epichlorohydrin with one mole of ammonia in about 20–30 percent aqueous solution at 0°–40°C. and maintaining that temperature until the reaction exotherm has substantially ceased. This normally requires from 1 to 10 hours, depending upon the volumes of reactants employed. Any conveniently available concentration of aqueous ammonia can be used in the initial process step, for example, a concentration in the range of 10–30 percent. The reaction mixture is then suitably digested, preferably with at least occasional stirring, in the same temperature range for an additional 1–30 hours, then heated an additional 0.2–5 hours at 50°–100°C. The progress of the reaction in this first process step is conveniently followed by determination of the water-soluble inorganic chloride present, for example, by titration with silver nitrate in the standard Volhard method. Best results are obtained by running this process step until the ionic chloride concentration approaches a maximum value without gelation occurring. This maximum signifies the point at which essentially all of the epichlorohydrin has reacted. The prepolymer solution may be adjusted by dilution with water to a solids content of 20–75 percent by weight in this finishing heating step for more convenient operation.

When using the lower amounts of epichlorohydrin, i.e., 0.9–1.2 moles per mole of ammonia, and the ionic chloride content is above 13.5 percent, it becomes necessary, in order to prevent gelling, to dilute the resin mixture to 20–25 percent solids content and, optionally, to shear it in the final digestion stage in the first step of the process.

In the neutralization step which is the essential improvement in the reaction, the quantity of added base is essentially the stoichiometric equivalent of the ionic chloride present in the reaction mixture. Slightly more or less base can be employed without serious loss of the advantage this neutralization step provides, for example, about 0.9–1.05 equivalents. Preferably, the base is an alkali metal hydroxide and aqueous sodium hydroxide is most preferred. Other bases such as potassium hydroxide, sodium carbonate, or lithium hydroxide can also be used.

The neutralization is ordinarily accomplished merely by stirring the intermediate resin solution with added base at ambient temperature. The solution can be warmed to facilitate completion of the neutralization if desired, for example, to 50°C.

In the third reaction step, the neutralized prepolymer or intermediate resin solution is reacted with about 0.1–1 part, preferably about 0.1–0.7 part of epichlorohydrin per part of resin. This reaction step is carried out at about 40°–100°C., preferably at 50°–80°C., for a reaction time of 0.2–5 hours so as to react essentially all of the added epichlorohydrin.

More than the defined maximum of epichlorohydrin can be added to the prepolymer solution in the second process step, but such excess reactant is unnecessary and merely represents that much more by-product or unreacted material which may have to be removed from the final resin solution. In both the prepolymer formation and in the final reaction with epichlorohydrin and the following digestion, a product with the desired properties can be obtained and premature gelation of the final resin solution can be avoided by balancing the reactant limits with the concentration of the resin solution and the temperature and duration of the digestion steps. Thus, lower concentrations and temperatures and shorter digestion periods all can help to avoid gelation which might otherwise occur in the final product solution. The reaction conditions defined above, therefore, represent practical process limits which can be used in a balanced interrelationship to obtain optimum properties in the final product.

A particular advantage of the present improved process when carried out as outlined above is that the intermediate neutralization of the reaction mixture substantially eliminates the formation of 1,3-dichloro-2-propanol which is a substantial by-product of prior art processes and thus makes possible the more efficient use of a smaller quantity of epichlorohydrin. Since this by-product usually had to be removed from the final resin solution by distillation or by solvent extraction, its elimination by the present improvement also eliminates the separation step and reduces by that much the time for the overall process.

The epichlorohydrin-ammonia resin product of this new process is readily absorbed by cellulosic fibers. It is preferably added to a paper pulp slurry at the beater, stock chest, head box or other point which permits adequate mixing prior to formation of the paper sheet. The paper pulp may be any conventional pulp including chemically and mechanically produced wood pulp, rag pulp and similar cellulosic fibers. The amount of additive depends upon the specific pulp and the wet strength desired. Useful wet strength improvement is obtained with 0.1–5 weight percent of resin solids based on the paper pulp, dry basis. Optimum performance is generally obtained with a loading of 0.2–1 percent. After treating the pulp with the aqueous resin solution, the conventional paper drying cycle at about 85°C. converts the resin into a cross-linked insoluble solid which imparts a high degree of wet strength to the treated paper. This constitutes an advantage for the new product of considerable value, because some improved epichlorohydrinammonia resins require curing at temperatures above 100°C. for about an hour to obtain desirable properties as wetstrength paper additives. The new resin is, therefore, much more easily adaptable to conventional papermaking processes.

EXAMPLE 1

Prepolymer Preparation

Into a 2-liter flask equipped with stirrer, thermometer, reflux condenser, and feeding funnel were charged 145.5 gms. of 28% aqueous $NH_3$. The reaction flask was submerged in ice water as an aid to control the reaction temperature. Then, 277.5 gms. of epichlorohydrin were fed in at a rate to maintain a reaction temperature between 10°–15°C. After the epichlorohydrin had been fed in, the contents were stirred and digested at 20°C. for 4 hours, the reactants heated to 35°C. and further stirred and digested at this temperature for 2 hours. At this point, 635 gms. of distilled water were added, and with stirring, the reactants were heated to 63°–64°C. and digested at this temperature for 1.25 hours. This is the prepolymer which has an ionic chloride content of 6.1% by Volhard chloride determination and a solids content around 30% determined by drying a sample in an air oven at 125°C. for 3 hours.

Neutralization and Wet Strength Resin Preparation

Into a flask equipped with stirrer, thermometer and reflux condenser were weighed 100 gms. of the above prepolymer plus 50 gms. of water. With stirring at 25°C., 13.74 gms. of 50% NaOH were added and digested for one hour. At this time, 8.0 gms. of epichlorohydrin were added, heating the contents to 60°–65°C. and digesting at this temperature for 1.3 hours. The resulting wet strength resin has the following analysis:

| | |
|---|---|
| Total % Solids | 24.6 |
| % NaCl | 5.8 |
| % Active Wet Strength Resin | 18.8 |

Wet Strength Test

Unbleached kraft pulp was beaten to a Canadian Standard Freeness (TAPPI Method T227M-50) of 500 mls. in a Nobel and Wood beater. The pulp was diluted to 0.25% solids and the pH adjusted as required with HCl or NaOH (pH of 7.5). The desired amount of additive was blended with the test pulp slurry for 5 minutes. Sheets were then formed on a British handsheet machine (TAPPI Method T205M-1960). The test sheets were dried at 105° for 60 seconds and then cured for 0.5 hour at 85°C. After conditioning at room temperature, the test sheets were soaked in water for 2 hours before measuring the burst strength by TAPPI Method T403M-53. Test sheets made up in the same way using an epichlorohydrin-ammonia resin prepared by the process of U.S. Pat. No. 3,655,506 ("Old Resin") were also tested for purpose of comparison.

Results of Testing

| Loading, Lbs./ton pulp | Wet Burst Strength, lbs./sq. in. | |
|---|---|---|
| | New Resin | Oil Resin |
| 5 | 6.9 | 3.8 |
| 10 | 14.5 | 10.0 |
| 20 | 23.0 | 18.5 |

EXAMPLES 2–3

The procedure of Example 1 was repeated except for reacting the neutralized resin with 4.0 g. and 12.0 g. respectively of epichlorohydrin in the last reaction step.

Test sheets were made up as above using two loadings of each resin. The results of testing are listed below.

Results of Testing

| Loading lbs./ton pulp | Wet Burst Strength, lbs./sq. in. | |
|---|---|---|
| | Ex. 2 | Ex. 3 |
| 10 | 12.0 | 13.1 |
| 20 | 18.8 | 19.8 |

EXAMPLES 4–7

These examples further illustrate the new process and the effects of varying some of the reaction conditions such as ratio of epichlorohydrin used, concentration of the resin solution, and temperature and duration of digestion. The preparations were made following the general procedure outlined in Example 1 with variations as noted in the tables below.

Prepolymer Preparation

| Example No. | Epi*/NH₃ molar ratio | Digestion Time and Temp. °C | Digestion after dilution | Product % ionic Cl |
| --- | --- | --- | --- | --- |
| 4 | 1.0 | (4 hrs. at 15°<br>(16 hrs. at 25° | 1.25 hrs. at 60° | 7.1 |
| 5 | 1.15 | (2 hrs. at 20°<br>(16 hrs. at 26° | 1.25 hrs. at 60–64° | 6.5 |
| 6 | 0.9 | 16 hrs. at 25° | 1 hr. at 65° | 8.0 |
| 7 | 1.4 | (5 hrs. at 16–20°<br>(16 hrs. at 25° | 1 hr. at 65° | 5.5 |

*epichlorohydrin

Final Resin Preparation

| Example No. | Neutralization g. H₂O added⁽¹⁾ | Digestion hrs. at 25–30°C | Epi Ratio g./g.resin | Epi Reaction Time, Temp. |
| --- | --- | --- | --- | --- |
| 4 | 50 | 1 | 0.34 | 1 hr., 50°C⁽²⁾ |
| 4a | 100 | 1 | 0.34 | 1 hr., 50°C |
| 5 | 50 | 0.5 | 0.26 | 45 min., 50°C |
| 6 | 150 | 1 | 0.69 | 30 min., 50°C |
| 6a | 150 | 1 | 0.69 | 1 hr., 50°C |
| 7 | 50 | 1.25 | 0.46 | 1 hr., 65°C |

⁽¹⁾per 100 g. of prepolymer solution of about 30% resin content.
⁽²⁾solution gelled.

The products of Examples 4a, 5, 6, and 7 were tested as wet strength paper additives by the method previously described.

| Loading lbs./ton pulp | Wet Strength, lbs./sq. in. | | | |
| --- | --- | --- | --- | --- |
| | Ex. 4a | Ex. 5 | Ex. 6 | Ex. 7 |
| 5 | 5.5 | 5.2 | 6.1 | 5.1 |
| 10 | 11.8 | 10.8 | 10.8 | 11.3 |
| 20 | 15.5 | 21.6 | 19.0 | 19.0 |

I claim:

1. In a process for making a thermosetting cationic water-soluble resin which comprises
    a. forming an intermediate resin solution by reacting about 0.9 to about 2.1 moles of epichlorohydrin with one mole of ammonia in aqueous solution and maintaining the prepolymer reaction mixture thereby obtained at about 0°–100°C. until essentially no unreacted epichlorohydrin remains, and
    b. reacting the intermediate resin solution thereby formed with about 0.1–1.0 part of additional epichlorohydrin based on the weight of resin in the intermediate resin solution at about 40°–100°C., the improvement of neutralizing the intermediate resin solution prior to its further reaction with additional epichlorohydrin by adding to said solution a quantity of strong base about equivalent to the ionic chloride present therein.

2. The process of claim 1 wherein step (a) for forming an intermediate resin solution comprises reacting about 1–1.5 moles of epichlorohydrin with a mole of ammonia in about 20–30 percent aqueous solution at 0°–40°C., maintaining that temperature until the epichlorohydrin-ammonia reaction exotherm has substantially ceased, digesting the resulting reaction mixture at 0°–40°C. for 1–30 hours, and then heating said reaction mixture at 50°–100°C. for 0.2–5 hours.

3. The process of claim 2 wherein step (b) comprises reacting the neutralized intermediate resin solution with about 0.1–0.7 part of epichlorohydrin per part by weight of resin at 50°–80°C. for 0.2–5 hours.

4. The process of claim 3 wherein the strong base used to neutralize the intermediate resin solution is sodium hydroxide.

5. The finished resin product of the process of claim 1.

* * * * *